United States Patent [19]
Green

[11] Patent Number: 6,048,374
[45] Date of Patent: Apr. 11, 2000

[54] PROCESS AND DEVICE FOR PYROLYSIS OF FEEDSTOCK

[76] Inventor: Alex E. S. Green, 2900 NW. 14$^{th}$ Pl., Gainesville, Fla. 32605-5044

[21] Appl. No.: 08/912,485

[22] Filed: Aug. 18, 1997

[51] Int. Cl.$^7$ .................................................. C10J 3/00
[52] U.S. Cl. ............................ 48/209; 48/62 R; 48/77; 48/89; 110/235; 110/346; 201/16; 201/25; 201/35; 202/90; 202/118
[58] Field of Search ............................. 48/62 R, 77, 89, 48/209; 110/208, 346, 235; 201/2.5, 16, 30, 35, 25, 40; 202/90, 118; 585/240

[56] References Cited

U.S. PATENT DOCUMENTS

| | | | |
|---|---|---|---|
| 843,599 | 2/1907 | Hammatt | 201/30 |
| 1,358,664 | 11/1920 | Wallace | 201/35 |
| 3,787,292 | 1/1974 | Keappler | 202/118 |
| 4,030,984 | 6/1977 | Chambers | 201/25 |
| 4,098,649 | 7/1978 | Redker | 201/2.5 |
| 4,123,332 | 10/1978 | Rotter . | |
| 4,210,491 | 7/1980 | Schulman | 201/2.5 |
| 4,230,451 | 10/1980 | Chambe | 432/72 |
| 4,483,256 | 11/1984 | Brashear . | |
| 5,226,927 | 7/1993 | Rundstrom . | |
| 5,266,086 | 11/1993 | Bailey et al. . | |
| 5,293,843 | 3/1994 | Provol et al. . | |
| 5,504,259 | 4/1996 | Diebold et al. . | |
| 5,618,321 | 4/1997 | Beierle et al. . | |

FOREIGN PATENT DOCUMENTS

| | | |
|---|---|---|
| 0016585 | 10/1980 | European Pat. Off. . |
| 0663433 | 7/1995 | European Pat. Off. . |
| 0753783 | 10/1933 | France . |
| 2310531 | 3/1976 | France . |
| 100569 | of 1873 | United Kingdom . |
| 96 032163 | 10/1996 | WIPO . |

OTHER PUBLICATIONS

Kroschwitz et al. (Kirk–Othmer Encyclopedia of Chemical Technology, Fourth Ed. vol. 12, pp. 43–48, 1994.

Green, Alex, Sergio Peres, James Mullin, Robert W. Anderson (1997) "Solid Fuel Gasification for Gas Turbines" Submitted for the Orlando, FL ASME–IGTI Gas Turbine Conference, Jun. 2–6, 1997, pp. 1–8.

Green, Alex and Sergio Peres, "Thermal Conversion Of Biomass, A Strategic Analysis" In: University of Florida, Florida Cooperative Extension Service, EES 156, pp. 1–8.

*Primary Examiner*—Hien Tran
*Attorney, Agent, or Firm*—Saliwanchik, Lloyd & Saliwanchik

[57] ABSTRACT

The subject invention pertains to unique and advantageous systems for gasifying and/or liquefying biomass. The systems of the subject invention utilize a unique design whereby heat from a combustion chamber is used to directly gasify or liquefy biomass. In a preferred embodiment, the biomass is moved through a reactor tube in which all the gasification and/or liquefaction takes place. Preferably, char exits the biomass reactor tube and enters the combustion chamber where the char serves as fuel for combustion. The combustion chamber partially surrounds the reactor tube and is in direct thermal contact with the reactor tube such that heat from the combustion chamber passes through the reactor wall and directly heats the biomass within the reactor tube.

50 Claims, 4 Drawing Sheets

PROCESS AND DEVICE FOR PYROLYSIS OF FEEDSTOCK

BACKGROUND OF THE INVENTION

Combustion of biomass has been used by humankind to generate heat and light for about 500 millennia. Biomass was the world's predominant energy source until fossil fuels took over in the industrial world, during the industrial revolution. As a renewable energy source, biomass can now re-assume greater energy loads while serving a number of other economic, environmental, and social purposes. Biomass can include, for example, wood, wood waste, agricultural waste, energy crops, municipal solid waste, sewage sludge and cellulosic type industrial waste.

Biomass is made by photoreactions such as $$6CO_2 + 5H_2O \text{ sunlight } C_6H_{10}O_5 + 6O_2$$

leading to cellulosic type compounds such as $C_6H_{10}O_5$. Biomass fuel is greenhouse neutral since when burned it simply releases carbon dioxide and water that it took out of the atmosphere when it grew.

The conversion of heat to mechanical work can be accomplished via hot air engines, steam engines or internal combustion engines (ICE). Hot air and steam can be made by the direct combustion of biomass. However, for use with reciprocating or turbine ICEs, which have been dominant in the $20^{th}$ century, biomass is best converted to liquid or gaseous fuels.

Gasification is a thermal process of changing a solid fuel such as coal, biomass or municipal solid waste into combustible gas and oil vapors. Four conventional biomass gasifier types that have evolved over many years are the fixed-bed updraft gasifier, the fixed bed downdraft gasifier, the moving bed gasifier, and the fluidized bed gasifier. Each type has advantages which are dependent upon the operating conditions, the output power required, and various other factors.

These conventional gasifiers typically create the heat for gasification by burning fuel in the gasification chamber itself. This can involve injecting air with its nitrogen into the gasification chamber, which dilutes the output gas with inert nitrogen as well as the products of combustion, including $CO_2$ and $H_2O$. The fuel being burned to generate the heat for gasification is typically burned without sufficient oxygen, thus creating the fuel gas carbon monoxide.

A new class of gasifiers, referred to as indirectly heated gasifiers (IHGs), can generate at least a portion of the heat of gasification by combustion carried out in a separate chamber from the gasifier reactor. Accordingly, these IHGs reduce dilution of the output gas with nitrogen, carbon dioxide and water vapor. For example, one such gasifier heats sand in a separate combustion chamber and then transfers the hot sand into the gasification chamber to provide the heat for gasification. However, this process of heating and transferring sand is complicated and applies mainly to large gasification systems.

Depending upon the gasification agent and the gasifier, typical biomass gasifiers produce combustible $CO$, $H_2$, $CH_4$, and other light hydrocarbons, diluted with non-combustibles $N_2$, $CO_2$ and $H_2O$ vapor. The heat of combustion of the product gas is determined by the biomass feedstock and gasification agent used, as well as by the operational conditions, such as pressure, temperature, residence time and heat loss or external heat input.

The types of gases produced by biomass gasification can be divided into three categories according to their heat value (HV). Low heating value (LHV) gas (~6 kJ/liter) is produced by traditional gasifiers when air is used as the gasifier agent. The gas is used on site since storage and/or transportation of LHV gas are not economically favorable. Medium heating value (MHV) gas (~13 kJ/liter) can be produced with traditional gasifiers when oxygen is used as the gasifier agent since dilution by nitrogen is avoided. Medium HV gas can be used as fuel for internal combustion engines and gas turbines. In addition, medium HV gas can also be produced with IHGs in which the combustion chamber and the gasification chamber are separated. In IHGs the gasification process takes place without external oxygen (or nitrogen) and the output gas consists mostly of carbon monoxide with varying concentrations of the fuels hydrogen, methane, ethylene, ethane and other hydrocarbons, as well as some non-fuels such as carbon dioxide and water vapor. Medium HV gas can be used for the production of synthetic fuels, such as $H_2$, gasoline, methanol, synthetic natural gas, etc. High HV gas (~37 kJ/liter) is usually produced from medium HV gases. These gases can be used as substitutes for natural gas which usually has a heating value of about 50 kJ/liter.

Gas turbines (GT) have shown promise as an efficient means of transforming heat into mechanical work and are now serving as major components of large new electricity generation systems using natural gas. For example, a low cost solid fuel (SF) cogasifier fed by low cost local feedstocks can be coupled with smaller GT systems adapted for medium HV gas to produce electricity in, for example, remote regions where availability of electricity is limited. The cogasification of biomass with other domestic fuels can provide a long term strategy for effective utilization of biomass. For example, the blending of oxygenated fuels such as biomass with carbonaceous fuels such as coals, coke, and chars in a small cogeneration system can have technological, economic, and environmental advantages. In addition, interest in distributed electricity generation is creating a need for low cost gasifiers.

Even with a low cost gasifier, a gasifier-microturbinegenerator (GMTG) might have difficulty these days competing economically with simpler natural gas microturbine generating systems in many locations because of the current low price of natural gas in the United States. However GMTGs could be economically competitive if they could also serve secondary and tertiary added value functions. The standby production of liquid fuels and chemicals from biomass is an example of a useful secondary function that could help in amortizing the capital cost of a new gasifier. Another societal function that could be served in the longer term by an IHG biomass gasifier is the gasification or liquefaction of the organic matter in metal ladened biomass with the concentration of toxic metals is the char ash. Examples of this need arise in the disposal of plants used in phytoremediation of toxic sites or the disposal of copper chromium arsenate (CCA) treated wood that has exceeded its lifespan. Additional functions, such as the use of the microturbine exhaust output for generating process steam or heat for drying crops or biomass fuel, would further enhance the economic value of the GMTG system.

BRIEF SUMMARY OF THE INVENTION

The subject invention pertains to unique and advantageous systems for gasifying and/or liquefing biomass. The systems of the subject invention utilize a unique design whereby heat from a combustion chamber is used to directly gasify or liquify biomass. In a preferred embodiment, the biomass is moved through a reactor tube in which gasification and/or liquefaction, i.e. the production of gases which condense at ordinary temperatures, takes place. Char is extruded from the biomass reactor tube and enters the combustion chamber where the char serves as fuel for combustion. The combustion chamber partially surrounds the reactor tube and is in direct thermal contact with the reactor tube such that heat from the combustion chamber passes through the reactor wall and directly heats the biomass within the reactor tube.

In a specific embodiment the subject invention provides methods and apparatus for power generation utilizing an indirectly heated gasifier of the subject invention to provide fuel for small gas turbine generators. Thus, the system of the subject invention can be used for the gasification of solid fuel for small gas turbines.

The subject invention is also capable of serving secondary and tertiary added value functions such as standby liquefaction of biomass or concentration of toxic metals in biomass into a residual char that represents a small percentage of the original biomass. The small percentage may be, for example, about 5% or less. The system of the subject invention can be operated in a variety of modes with a variety of feedstocks including non-biomass fuels such as coal, tire crumb, plastic chips, refuse derived fuel (RDF) etc.

An advantageous feature of the subject invention is its simple indirect heating of the solid fuel which is to be gasified. The subject invention can utilize a simple, continuously fed, high temperature reactor based upon advanced materials and coatings such as those developed for advanced gas turbines. Advantageously, the heat generated during the combustion stage of the power generation process can be conducted through the internal structure of the gasifier to heat the biomass which is introduced into the gasifier. There can exist a temperature gradient whereby the biomass is exposed to progressively higher temperatures as it moves through the gasifier and is heated to high temperatures for gasification and/or liquefaction.

In a specific embodiment of the subject invention biomass is conveyed through the system by at least one auger which rotates in such a way as to move the biomass from an inner hopper through the gasifier. Depending on output needs, multiple auger-reactors can be utilized. As the biomass gasifies, the gases can rise up through the biomass being moved by the auger blade such that the biomass can act as a filter for the output gases. In an alternative embodiment, the auger shaft can be hollow and comprise openings to the biomass so as to provide a means for gases and/or liquefaction particles produced from the gasification and/or liquefaction process to travel out through the hollow auger shaft, thereby bypassing the filtering action of the input feedstock.

A further aspect of the subject invention involves proper blending of fuels to insure proper hydrogen/carbon (H/C) and oxygen/carbon (O/C) ratios such that steam or other hydrogenating agents are not necessary.

A further aspect of the subject invention is a method and apparatus for operating to produce, for example, oil and/or liquids.

A further aspect of the subject invention is provisions for burning extruded char-ash-tar (CAT), or extruded char-ash (CA) when tar is fully gasified, with air to provide heat for the overall gasification or liquefaction processes.

A further aspect of the subject invention is the application of anaerobic indirectly heated gasifiers to the concentration of metals and other toxic substances in the char-ash. In this particular embodiment the char-ash burning step is by-passed and part of the derived gas and, when necessary, external fuel are used to provide the heat for the gasification or liquefaction processes.

A further aspect of the subject invention is a provision for adapting to a char-ash capture and metal recovery mode, for example when the biomass contains contaminants.

A further aspect of the subject invention is a provision for adaptation to an ash encapsulation mode.

Other objects, advantages, and features of the subject invention will be apparent from the following description of the preferred embodiment taken in conjunction with the accompanying drawings.

DETAILED DISCLOSURE OF THE INVENTION

The subject invention pertains to unique and advantageous systems for gasifying and/or liquefying biomass. The systems of the subject invention utilize a unique design whereby heat from a combustion chamber is used to directly gasify or liquefy biomass. In a preferred embodiment, the biomass is moved through a reactor tube in which all the gasification and/or liquefaction takes place. Char exits the biomass reactor tube and enters the combustion chamber where the char serves as fuel for combustion. The combustion chamber partially surrounds the reactor tube and is in direct thermal contact with the reactor tube such that heat from the combustion chamber passes through the reactor wall and directly heats the biomass within the reactor tube. The term "gasification" as used herein refers to, in general, the production of hot gases that do not condense at ordinary environmental temperatures and pressures. The term "liquefaction" as used herein refers to, in general, the production of hot gases that condense to liquids under ordinary environment temperatures and pressures. In accordance with the subject invention, gasification and liquefaction can occur simultaneously. The term "pyrolysis" as used herein refers to, in general, gasification and/or liquefaction.

In a specific embodiment the subject invention provides methods and apparatuses for power generation utilizing an indirectly heated gasifier for small gas turbine generators. The subject invention can be used in solid fuel gasification for small gas turbines.

Figure 1:
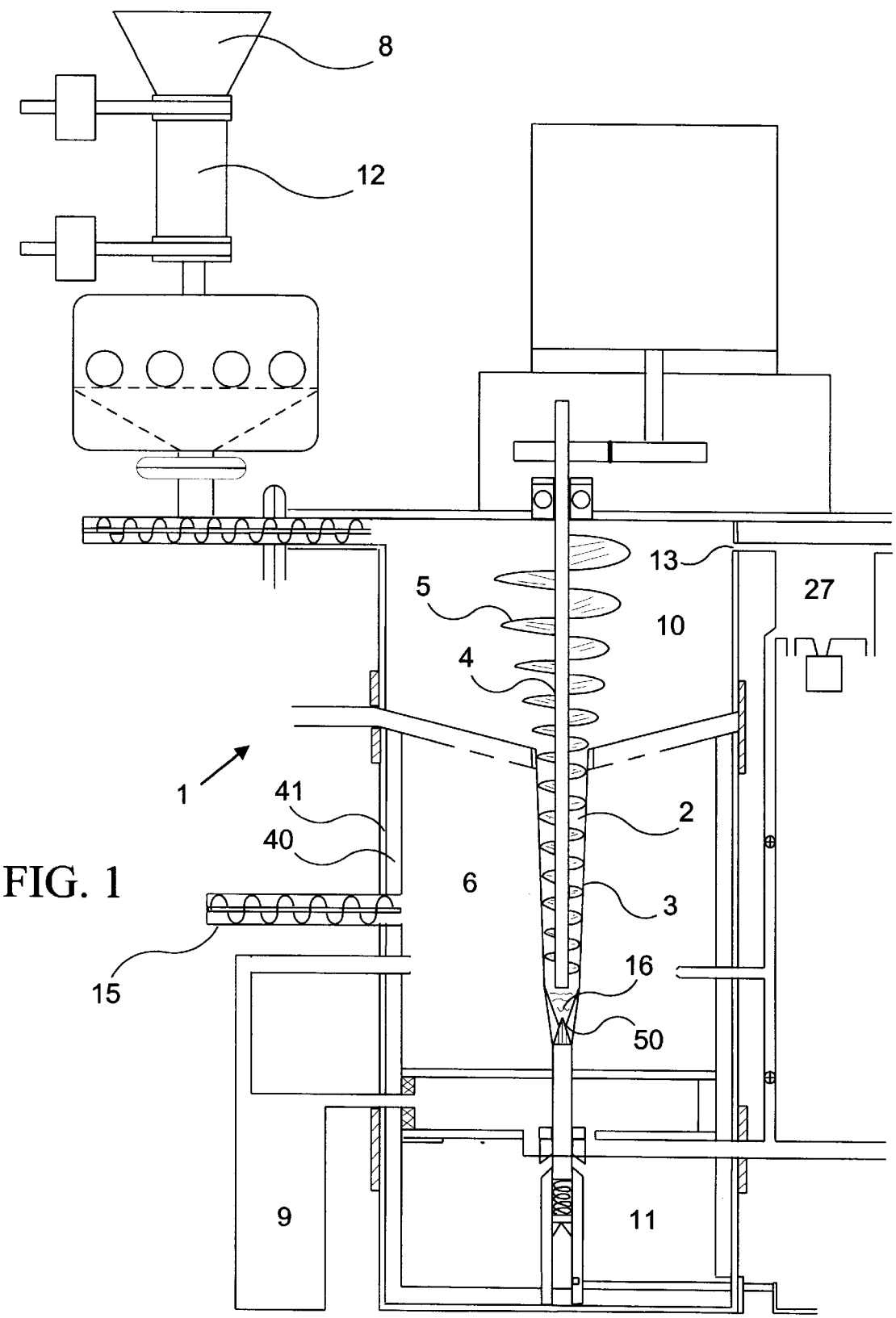
FIG. 1 illustrates a cross-section of a solid fuel, indirectly heated, gasifier according to the subject invention.

FIG. 1 illustrates a compact gasifier I which can produce, for example, a medium HV gas with an output capable of running a microturbine generator. The subject gasifier can utilize a variety of blended feedstocks, for example, wood chips, newspaper, mixed waste paper, peat, energy crops, agricultural residues as well as coal, tire crumb, plastics, RDF etc. The output of a single or multiple module gasifier according to the subject invention can be sufficient to power a small gas turbine generator, for example as a part of a distributed electrical system. The subject invention can take advantage of high temperature materials and coatings of the nature of those used for advanced gas turbines. Further, the subject gasifier can deliver medium HV gaseous fuels, for example free of ash, char, and tars, to a small gas turbine-generator. These small gas turbines can produce, for example, about 10 to 250 kW, as compared to gas turbine generators in the megawatt or multi-megawatt range.

An important feature of the subject invention is a means for feeding the material from the inner hopper 10 into the reactor tube 2. For example, a uniform or tapered auger 4 can be utilized. The auger 4 and reactor tube 2 should be able to withstand high temperatures. Metallic materials such as Haynes 214 or 230 alloys or high temperature Inco or Rolled alloys can be used such that the subject gasifier can accomplish high yield gasification or liquefaction in a single stage. Alternatively the reactor tube can be made out of advanced ceramics or composites. The higher temperatures not only foster rapid and complete volatilization, but also promote the chemical reactions with the char, largely carbon (C):

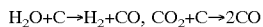

$$H_2O+C \rightarrow H_2+CO,\ CO_2+C \rightarrow 2CO$$

Advantageously, these chemical reactions increase the heating value of the gaseous output, further increase volatile generation, and decrease char residue.

In a specific embodiment, the subject gasifier involves the feeding of biomass into inner hopper 10 such that a rotating auger flight 5 can force the biomass into reactor tube 2. While residing in the inner hopper, the biomass can be heated by exposure to the bottom cone of the inner hopper and the gases emanating from the reactor tube 2. Once in the reactor tube 2, the biomass can be further and more rapidly heated by heat produced by, for example, a flame in the combustion chamber 6 which is conducted through the reactor tube walls 3. This heat conducted through the reactor tube walls 3 causes gasification of the biomass as the biomass is moved through the reactor tube 2 by the rotating auger flight 5. The gases given off during gasification can travel through the biomass in reactor tube 2 toward the inner hopper 10, so as to be filtered by the incoming feedstock, and subsequently outputted via, for example, an output gas opening 13. Once the biomass reaches the end of the reactor tube 2, it becomes a char-ash-tar (CAT) with the amount of the tar component depending upon feed rate, temperature of operation, input feedstock, and other variables.

The subject invention can provide a combustion chamber 6 for burning the extruded char-tar with air to provide at least a portion, and preferably all, of the heat and corresponding high temperatures needed for the gasification or liquefaction process within the reactor tube 2. The heat from the combustion chamber 6 conducts through the wall 3 of the reactor tube 2 and can be transferred to the feedstock by contact of the feedstock with the reactor tube 2. A temperature gradient can be established, for example in steady state, which provides higher temperatures as the biomass heats up as it moves along the reactor tube and is subsequently transformed into the char-ash-tarplug 16. At the end of the reactor tube, the char-ash-tar can be pushed out of outlet 50 and enter the combustion chamber 6. Once in the combustion chamber 6, air, for example preheated, can be provided by blower 9, and the char or char-ash-tar can be burned to create heat that is then conducted through the reactor tube walls to gasify the biomass. The air can be preheated by, for example, the combustion chamber's exhaust gases using a heat exchanger.

Advantageously, the subject invention can utilize this indirect heating of feedstock for oxygen-free volatilization of the feedstock. The outer surface 40 and 41 of the gasifier 1 can be made of combinations of materials which insulate the internal chambers of the gasifier from the outside. This keeps the heat, which is used to heat the biomass, in the gasifier and reduces the heat in the surrounding environment. The reactor tube 2, preferably tapered, can be made from materials and coatings which allow heat from combustion chamber 6 to conduct through to the biomass. In order to allow for gasification of the biomass, the materials used for the reactor tube walls, the auger, and the auger blade should, preferably, be able to withstand high temperatures. Higher gasification temperatures can increase gas yield. In a preferred embodiment, the gasification temperature exceeds about 800° C. (1472° F.) and most preferably is about 1000° C. (1822° F.) to about 1200° C. (2191° F.). Preferably, production of condensable gases, i.e. liquefaction, can occur within a temperature range of about 400° C. (752° F.) and about 800° C. (1472° F.), and most preferably within the range of about 500° C. (932° F.) and about 600° C. (1112° F.). The gasification and/or liquefaction of the biomass can create pressure in the reactor tube 2 and inner hopper 10. This pressure can range greatly depending on the exit flow rate of the gasifier. For example, the pressure in the inner hopper can be maintained as low as about 1 psi gauge. In another specific embodiment, pressures on the order of about 100 psi can be generated in the reactor tube 2 and maintained in the inner hopper 10. A means for the pyrolysis-gasification gas output to exit upward through the incoming feedstock allows the feedstock to serve as a filter, capturing tar comprising condensable complex organics which can then make an additional pass through the high temperature reactor to be broken down into smaller molecules. It is important to provide a means for preventing the gasification gases from exiting the reactor tube into the combustion chamber 6, wherein the combustion chamber 6 is preferably at a lower pressure. The CAT plug 16 at the outlet of the auger-reactor can provide a means for keeping gases from the reactor tube 2 from leaking into the combustion chamber 6. Accordingly, the CAT plug 16 insures that the gases generated in the auger-reactor work up through the incoming feedstock to the inner hopper. Advantageously, condensable gases, tars, liquids, and particles captured by the incoming feedstock make additional passes through the reactor tube, allowing these bigger molecules to be broken down into lighter gases.

It is important that the heat conducted from the combustion chamber through the reactor tube walls 2 be able to reach and, therefore heat, the biomass in the reactor tube. Depending on the type of biomass and other parameters, the reactor tube can be, for example, on the order of one to several inches in diameter in order to allow sufficient heating of the biomass. In a preferred embodiment, the diameter of the reactor tube is between about 1 and about 5 inches. Materials and coatings currently used in advanced gas turbines can be used in the subject gasifier, particularly in critical components such as the reactor tube.

In a preferred embodiment, the subject gasification method involves blending fuels in such a way as to insure proper H/C and O/C ratios, thus rendering steam or another hydrogenating agent unnecessary. Blending of feedstocks in accordance with the subject invention also gives acceptable char-ash-tar residue properties to form a CAT plug 16 capable of withstanding pressures in the reactor tube 2 and inner hopper 10 of approximately 1–100 psi. In addition, the blending is adjusted to achieve a net heating value input and sufficient char-tar output to provide the heat required for the endothermic gasification processes. This blending can occur in, for example, the outer hopper 8. In a specific embodiment, the system of the subject invention comprises a means for taking chipped feedstock from an outer hopper 8 at atmospheric pressure to an inner hopper 10 at gas pressures up to about 100 psi. For example, a lock hopper 12 can be utilized to input feedstock to the gasifier. Alternatively, other high pressure solid feeders such as the recently developed Stamet POSIMETRIC system can be adapted for this application.

Figure 3:
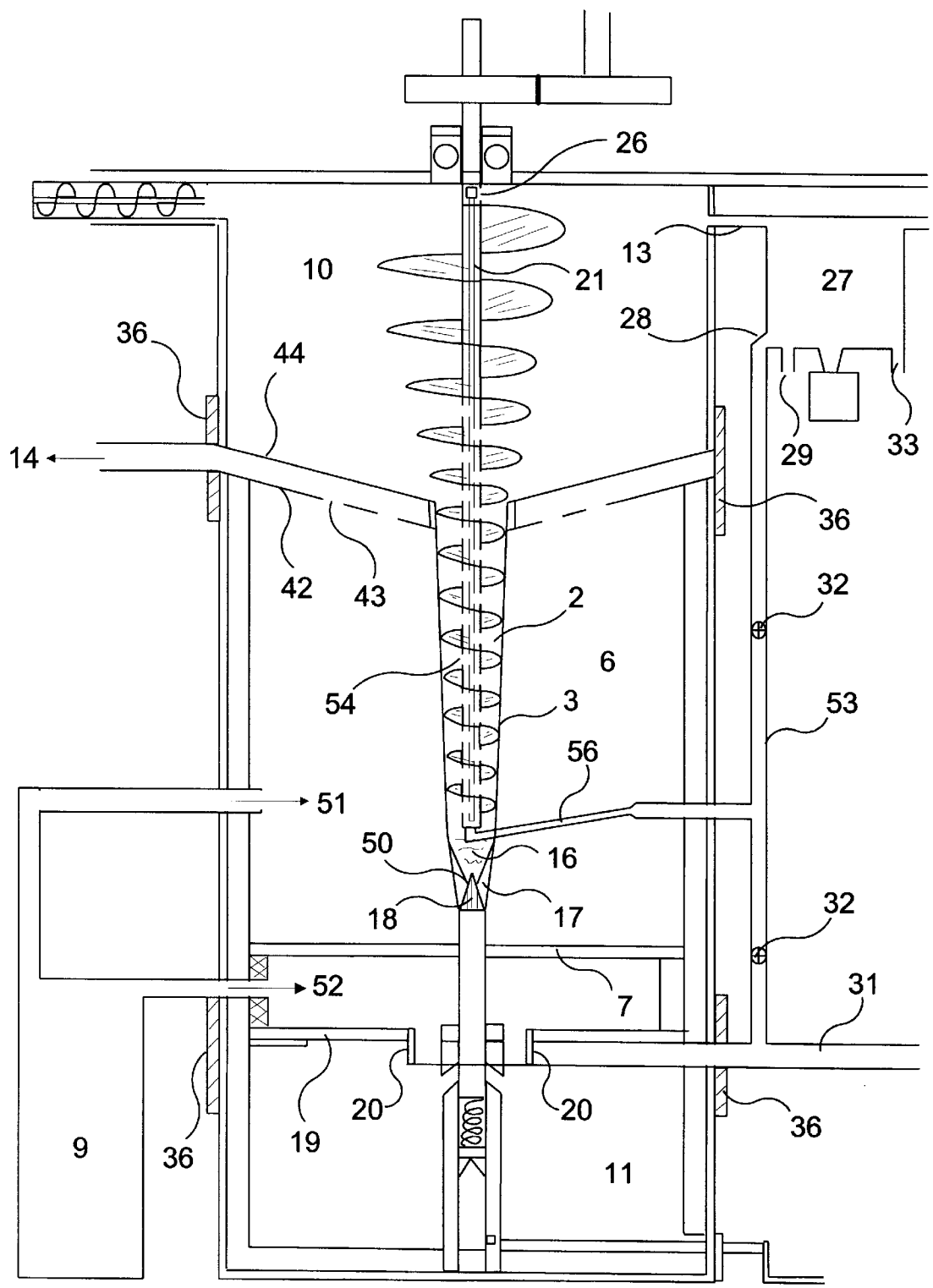
FIG. 3 illustrates a cross-section of a gasifier in accordance with the subject invention, adapted to enhance production of oil and/or liquids.

Referring to FIG. 3, in a preferred embodiment, the outlet 50 at the bottom of the reactor tube 2 is shaped such that the CAT forms a plug 16 capable of withstanding differential pressures up to about 100 psi or more. This plug 16 insures that the product gas goes toward the inner hopper 10 and the combustion gases go out, for example, the combustor exhaust 14. In a specific embodiment, the combustion exhaust can proceed through opening 43 in a flame guard plenum 42, where the exhaust can heat the funnel wall 44 carrying feedstock to the auger-reactor. This can begin the process of raising the feedstock to high temperatures and, in addition, extract heat from the combustion exhaust gases. Further extraction of the heat of the combustion exhaust gases can be accomplished by heating the incoming air 51, 52 using a heat exchanger.

At outlet 50 of orifice 17, an additional plugging means, for example an adjustable or spring loaded cone-like plug 18, can be used to plug orifice 17, for example at start up, and can be opened by the extrusion pressure when an adequate CAT plug 16 is formed. The plug 18 can also prevent output gases from leaking into the combustion chamber 6 and prevent combustion gases from leaking up into the reactor tube. This plug 18 can, for example, be operated by or maintained by spring loading 23. In these ways the outlet 50 can be adjustable, to optimize the CAT extrusion to serve as a plug for any feedstock.

As the CAT plug 16 is extruded out of outlet 50, the char falls onto, for example, grate 7. Blower 9 can blow heated air, into the combustion chamber 6 to provide over-fire tangential air 51 for combustion of the char, and under grate 7 to provide under-fire air 52 for combustion of the char. In a specific embodiment, the exhaust gases from 14 can be used with a simple heat exchanger to preheat the air entering the combustion chamber. Once the char is burned, the ashes can fall through grate 7 and spider 19 into ash receptacle 11. A start-up gas burner 20 (e.g., propane) can be utilized for initial heating of the reactor tube and can be located, for example, integrally with spider 19.

In a specific embodiment, a burning means, for example comprised of pipes 53 and valves 32, can be used for burning some of the product gas through burner 55 in the combustion chamber 6 to provide heat for gasification. In addition, an external source of gaseous fuel can be provided through input 31 for the combustion chamber when, for example, the feedstock has insufficient heating value, the feedstock is wet, or when the char ash is to be collected because of toxic content.

In a specific embodiment of the subject invention, the output of the gasifier is passed into separator 27 that can perform various functions depending upon the mode of operation of the microgasifier. In the gas production mode the separator primarily separates particles from the gas stream that have not already been filtered out by the incoming feedstock. In this mode molecular sieves can be used to separate molecular hydrogen from the remaining gases which can exit through orifice 29 into a compressor for storage and premium fuel use. These molecular sieves may be, for example, zeolite or ceramic.

In the liquid production mode, i.e., the production of condensable gases, separator 27 provides a water-cooled condensing system or a refrigerator cooled system to condense the oils and liquids arising from lower temperature pyrolysis of the incoming feedstock. These liquids can exit through orifice 33 and be collected during low gas needs of the microgasifier. Occasionally, these liquids can be distilled on site or be sent, for example, to a local distiller for separation into premium liquid fuels or chemicals.

Figure 2:
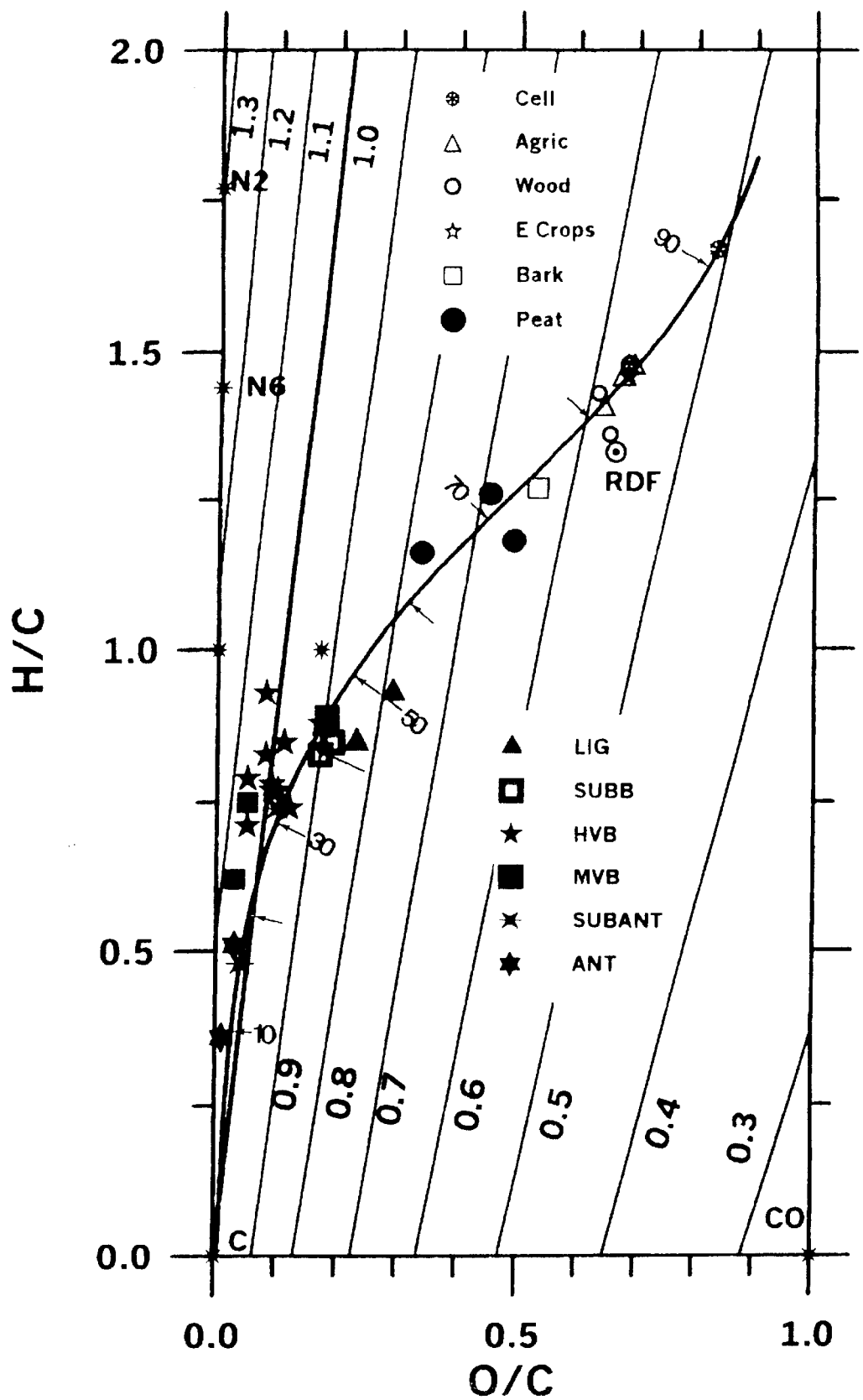
FIG. 2 is a composite drawing illustrating important properties of various feedstocks.

A means for adjusting feed rate to meet the desired gas power output can also be provided. The feed rate for a desired output can be estimated, for example when firing with dry biomass. FIG. 2 is a composite diagram giving the H/C and O/C atomic ratios of various potential solid feedstocks. Also shown in FIG. 2 are the heating values relative to carbon (32 KJ/g) and the volatile percentage assigned by ASTM weight loss method. An empirical rule that 1 gram of biomass at about 1000° C. typically produces about 0.75 liters gas with a heating value of approximately 15 kilojoules/liter can be used. Accordingly, one gram gives about 11 kilojoules gas energy. Hence, one gram/sec is capable of producing 11 kilowatts gas heating power. Assuming a 30% capability of converting gas fuel to electrical energy, which may be considered typical, gives 3.3 KW. Accordingly, a feed rate of one gram/sec corresponds to 3600 gram/hr or 3.6 kg/hr=3.6×2.2 (lb/kg)=7.9 lb/hr=3.3 KWe. Therefore a rule of thumb is =7.9/3.3=2.4 lb/hr biomass gives 1 KWe, for typical dry biomass. This corresponds to a heat rate of about 17M BTU/KW which is comparable with the heat rates of large but older coal or oil utilities. This heat rate can be further improved by optimizing the fuel blend utilized and/or the operational variables of the system.

Note that since the biomass heat value (HV) per gram is about 0.6×32 KJ=19 KJ whereas the HV of the gas produced is about 15 KJ, about 4 KJ are expended in the gasification process. If 20% of the initial feedstock produces a char-tar that has a HV of about 30 KJ/g the heat value of about 6 KJ is available for each gram of feedstock. This is more than enough char-tar to provide the energy required for gasification.

The corresponding calculation for other feedstocks can be carried out in an analogous way. For any feedstock, the solid fuel heating value per gram must be greater than the heating value of the gas generated per gram and must produce a char tar residue which when combusted will provide the endothermic energy needed for gasification. As referred to above, blending of available fuels may be conducted as described herein to achieve optimal performance for a given application. When blending fuels, attention must be paid to the physical and textural properties of the constituents to insure the filtering action of the input feedstock and the plugging effectiveness of the char-tar-ash extrusion.

In a specific embodiment of the subject invention, if single auger throughput is not sufficient, a multiple auger reactor system driven by, for example, a single variable speed motor and comprising a single inner hopper and a single combustion chamber can be implemented.

The basic microgasifier of the subject invention can be adapted to produce, for example, oil and/or liquids. Referring to FIG. 3, an inner tube 21 can be provided, for example, with apertures 54 that can be opened or closed, for example by rotating inner tube 21 up to or through 90°, to provide paths for the pyrolysis and gasification gases to go directly out of the auger reactor region to the top of the inner hopper 10. These gases can exit the inner tube through aperture 26 and subsequently through output gas opening 13. An external demister and water cooled condenser can be provided in the separator 27 to cool the condensable gases in order to extract oils and/or liquids. The non-condensable gases can be burned in the combustion chamber through outlet 28 and valve 32 with burner 55. Alternatively, through high temperature plumbing 56, part of these non-condensable gases can be pumped through the inner tube to speed the transport of the condensable gases to the condenser separator 27. Additionally, a means for adjusting excess air and tangential swirl can be used in the combustion chamber in order to lower the temperature in the combustion chamber and, therefore, lower the temperature acting on the reactor tube. In a specific embodiment, further reduction of the temperature acting on the reactor tube can be accomplished by deflecting the flame zone from the tube. The feed rate can also be increased so that the average temperature experienced by the feedstock before escaping as gases through apertures 54 is lowered.

Figure 4:
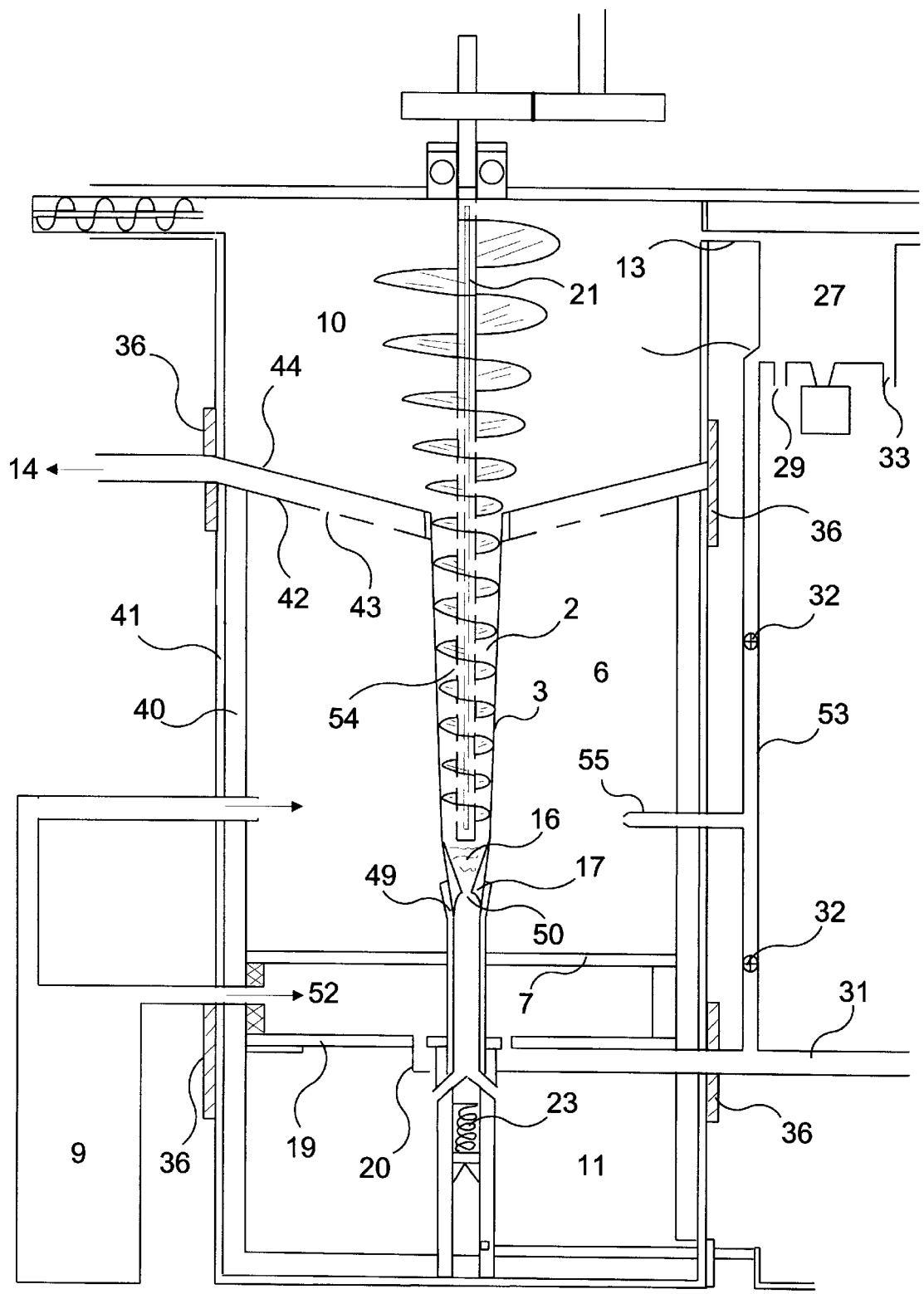
FIG. 4 illustrates a cross-section of a gasifier in accordance with the subject invention, adapted to collect rather than burn, the char-ash.

The basic microgasifier of the subject invention may also be modified or adapted in order to gasify feedstock with toxic contents. An anaerobic (without air) gasifier can lower the formation of volatile metal oxides or otherwise lower the volatilization of metallic constituents in favor of deposition in the char-ash residue. Referring to FIG. 4, an embodiment in accordance with the subject invention which can be used to gasify feedstock with toxic contents is shown. The gasification reactor is anaerobic, which can lower the formation of volatile metallic oxides or otherwise promote metallic deposition in the char-ash. For example, in the embodiment shown in FIG. 4, the change from FIG. 3 is the replacement of the male cone plug 18 by a female hollow tube 49 that extrudes char-ash, for example, through the diagonal orifices at its bottom. The openings of the ring burner-spider 14 are covered to avoid burning the char-ash ladened with toxics. Advantageously, this facilitates the adaption of the gasifier for the disposal of discarded copper chromium arsenate (CCA) treated wood and subsequent reconcentration of the CCA. This embodiment can also be useful for the disposal of plant matter used in phytoremediation to capture toxic metals from contaminated sites. The char-ash-tar outlet is modified to feed into a collector for later processing.

The gasifier consists of three major components that can be assembled, for example, with the help of the positioning rings 36 or flanges. The upper assembly is the pressure capable inner hopper and combustor exhaust plenum-outlet. The middle assembly is the combustor. The bottom assembly is the char-ash collector from the ring burner downward.

A means for inputting external solid feed (e.g., coal and/or tire chips) to provide heat of gasification or to enrich the feedstock can also be added to the outer hopper. In addition, an external hopper 15 and system for feeding stored fuel (e.g., coal, tire chips, RDF, heavy oil) directly to the combustor grate can be provided. The feeding of stored fuel directly to the combustor grate can provide gasification energy when, for example, the char-ash is ladened with toxics and, therefore, not burned. In addition, the feeding of solid fuels directly to the combustor grate can be useful when the normal feedstock is wet and/or when external gas supplies are limited. Feeding biomass to the gasifier via the outer hopper 8 and coal to the combustor via this external hopper can also have operational advantages when biomass feedstock must be stretched.

Chemicals can be blended with the feedstock to neutralize unwanted constituents, or to catalytically promote desirable constituents, in the output gases or liquids. A means for such blending can also be provided.

In addition, a specific embodiment can comprise a means for char-ash glassification. In a specific embodiment, low melting temperature material is added to the feedstock so that the extruded char-ash is melted and forms a glassy char-ash. In an additional embodiment, alkali rich materials such as grasses are included in the feedstock to yield a "wet" char-ash.

It should be understand that the examples and embodiments described herein are for illustrative purpose only and that various modifications or changes in light thereof will be suggested to persons skilled in the art and are to be included within the spirit and purview of this application and the scope of appended claims.

I claim:

1. A process for pyrolysis of feedstock, comprising the following steps:

introducing feedstock into, and moving said feedstock through, a reactor tube;

heating the feedstock within said reactor tube to a sufficient temperature such that pyrolysis occurs; and generating heat within a combustion chamber, wherein the combustion chamber is in direct thermal contact with the reactor tube such that heat generated within the combustion chamber is transferred to the feedstock in the reactor tube to provide the heat for pyrolysis, wherein the feedstock is introduced into the reactor tube from an inner hopper, wherein gases of pyrolysis travel though the feedstock in the inner hopper such that said feedstock in the inner hopper acts as a filter, wherein heat generated in the combustion chamber is transferred to the feedstock within the inner hopper.

2. The process, according to claim 1, wherein said feedstock comprises a substance selected from the group consisting of biomass wood chips, newspaper, mixed waste paper, peat, energy crops, agricultural residues, coal, tire chips, plastics, and RDF.

3. The process, according to claim 1, wherein feedstock residue exiting the reactor tube enters the combustion chamber where the exited residue is burned.

4. The process, according to claim 1, wherein the heat generated in the combustion chamber is conducted to the feedstock within the reactor tube through a reactor tube wall.

5. The process, according to claim 1, wherein the feedstock is moved through the reactor tube by a rotating auger.

6. The process, according to claim 1, wherein pyrolysis occurs within a temperature range from about 800° C. (1650° F.) to about 1200° C. (2190° F.) such that substantially anaerobic gasification occurs.

7. The process according to claim 1, wherein pyrolysis occurs within a temperature range from about 400° C. (752° F.) to about 800° C. (1472° F.) such that liquefaction occurs.

8. The process, according to claim 3, wherein the heat generated by burning the exited residue provides substantially all of the heat of pyrolysis.

9. The process, according to claim 3, wherein said reactor tube comprises an exit orifice, wherein a plug of char develops at the exit orifice to prevent the gases of pyrolysis from exiting into the combustion chamber.

10. The process, according to claim 5, wherein the auger comprises a hollow shaft having at least one opening, wherein gases of pyrolysis can exit through said hollow shaft.

11. The process, according to claim 9, further comprising the step of controlling the flow of gases into and out of the exit orifice of said reactor tube with a plugging means.

12. The process, according to claim 11, wherein said plugging means is spring loaded.

13. The process, according to claim 1, further comprising the step of capturing feedstock residue exiting the reactor tube, wherein said process is useful for pyrolysis of feedstock comprising a contaminant.

14. The process, according to claim 13, wherein said contaminant is selected from the group consisting of heavy metals, copper chromium arsenate, and other toxics.

15. The process, according to claim 1, wherein heat from the combustion chamber is used to preheat incoming combustion air.

16. The process, according to claim 1, wherein a portion of the gases of pyrolysis are burned in the combustion chamber.

17. The process, according to claim 1, wherein an external fuel source is burned in the combustion chamber.

18. The process, according to claim 17, wherein said external fuel source comprises a substance selected from the group consisting of coal, natural gas, rubber, refuse derived fuel, and biomass.

19. A process for pyrolysis of feedstock, comprising the following steps:

introducing feedstock into, and moving said feedstocks through, a reactor tube; and heating the feedstock within said reactor tube to a sufficient temperature such that pyrolysis occurs, wherein the feedstock is introduced into the reactor tube from an inner hopper, and wherein gases of pyrolysis travel through the feedstock in the inner hopper such that said feedstock in the inner hopper acts as a filter.

20. The process, according to claim 19, wherein said feedstock in the inner hopper is heated by said gases of pyrolysis as said gases of pyrolysis travel through said feedstock in the inner hopper.

21. The process according to claim 20, wherein, as the gases of pyrolysis heat the feedstock in the inner hopper, the gases of pyrolysis are cooled.

22. The process according to claim 19, wherein said feedstock in the inner hopper acts as a filter by capturing a substance from the gases of pyrolysis selected from the group consisting of: condensable gases, tars, liquids, condensable complex organics, and particles.

23. The process according to claim 22, wherein said substance captured by the feedstock in the inner hopper is subsequently carried into the reactor tube as the feedstock in the inner hopper is introduced into the reactor tube.

24. The process according to claim 19, wherein said gases of pyrolysis travel through the feedstock in the reactor tube such that said feedstock in the reactor tube acts as a filter.

25. The process according to claim 19, wherein the step of heating the feedstock comprises generating heat within a combustion chamber, wherein the combustion chamber is in direct thermal contact with the reaction tube such that heat generated within the combustion chamber is transferred to the feedstock in the reactor tube to provide the heat for pyrolysis.

26. The process according to claim 19, wherein low oxygen conditions of pyrolysis leads to essentially anaerobic gasification, wherein said essentially anaerobic pyrolysis lowers the formation of volatile metallic oxides and promotes metallic deposition in the feedstock residue.

27. A device for pyrolysis of feedstock, comprising:

a reactor tube within which pyrolysis of feedstock occurs;

a means for introducing feedstock into, and moving the feedstock through, the reactor tube; and a combustion chamber positioned such that the combustion chamber is in direct thermal contact with the reactor tube such that heat generated within the combustion chamber is transferred to the feedstock in the reactor tube to provide heat of pyrolysis, wherein the feedstock is introduced into the reactor tube from an inner hopper, and wherein gases of pyrolysis travel though the feedstock in the inner hopper such that said feedstock in the inner hopper acts as a filter.

28. The device, according to claim 27, wherein the means for moving said feedstock through said reactor is a rotating auger.

29. The device, according to claim 27, wherein said reactor tube comprises an exit orifice, wherein a plug of char develops at the exit orifice to prevent the gases from the pyrolysis of the feedstock from exiting into the combustion chamber.

30. The device, according to claim 27, wherein the auger comprises a hollow shaft having at least one opening, wherein the gases of pyrolysis can exit through said hollow shaft.

31. The device, according to claim 27, further comprising a plugging means, wherein said plugging means controls the flow of gases into and out of said exit orifice.

32. The device, according to claim 31, wherein said plugging means is spring loaded.

33. The device, according to claim 27, further comprising:

a means for capturing the feedstock residue exiting the reactor tube, wherein said device is useful for pyrolysis of feedstock containing contaminants.

34. The device, according to claim 27, further comprising a means for burning a portion of the gases of pyrolysis in the combustion chamber.

35. The device, according to claim 27, further comprising a means for providing an external fuel source to the combustion chamber.

36. The device, according to claim 30, comprising a means whereby a portion of the pyrolysis gases or external gases are injected into a lower end of the hollow shaft to hasten the transport of condensable gases to an external condenser liquid separator.

37. A method of pyrolysis of feedstock containing at least one contaminant using indirectly heated gasification, comprising the following steps:

moving feedstock containing at least one contaminant through a reactor tube; and heating the feedstock within said reactor tube to a sufficient temperature such that pyrolysis occurs, wherein the feedstock enters the reactor tube from an inner, wherein gases of pyrolysis travel through the feedstock in the inner hopper such that said feedstock in hopper acts as a filter, wherein low oxygen conditions of pyrolysis leads to lower containment of the at least one contaminant in the gaseous output and higher capture and concentration of the at least one contaminant in the feedstock residue.

38. The method according to claim 37, wherein said at least one contaminant is selected from the group consisting of heavy metals, copper, chromium, arsenate, and other toxics.

39. The method according to claim 37, wherein low oxygen conditions of pyrolysis leads to essentially anaerobic pyrolysis, wherein said essentially anaerobic pyrolysis lowers the formation of volatile metallic oxides and promotes metallic deposition in the feedstock residue.

40. The method according to claim 39, wherein said method is used for disposal of plant matter used in phytoremediation.

41. The method according to claim 37, wherein the feedstock is introduced into the reactor tube from an inner hopper, and wherein gases of pyrolysis travel through feedstock in the inner hopper such that said feedstock in the inner hopper acts as a filter.

42. The method according to claim 41, wherein said feedstock in the inner hopper is heated by said gases of pyrolysis as said gases of pyrolysis travel through said feedstock in the inner hopper.

43. The method according to claim 42, wherein, as the gases of pyrolysis heat the feedstock in the inner hopper, the gases of pyrolysis are cooled.

44. The method according to claim 41, wherein said feedstock in the inner hopper acts as a filter by capturing a substance selected from the group consisting of: condensable gases, tars, liquids, condensable complex organics, and particles.

45. The method according to claim 48, wherein said substance captured by the feedstock in the inner hopper is subsequently carried into the reactor tube as the feedstock in the inner hopper is introduced into the reactor tube.

46. A device for pyrolysis of feedstock, comprising:
   a reactor tube within which pyrolysis of feedstock occurs;
   a means for moving feedstock through the reactor tube;
   a means for heating the feedstock within said reactor tube to a sufficient temperature such that pyrolysis occurs; and
   an inner hopper, wherein the feedstock enters the reactor tube from the inner hopper, wherein gases of pyrolysis travel through the feedstock in the inner hopper such that said feedstock in the inner hopper acts as a filter.

47. The device according to claim 46, further comprising a means for capturing the feedstock residue exiting the reactor tube such that when pyrolysis of feedstock containing a contaminant occurs in the reactor tube, low oxygen conditions of pyrolysis leads to lower containment of the contaminant in the gaseous output and higher capture and concentration of the contaminant in the feedstock residue.

48. The device according to claim 46, further comprising a means for capturing the feedstock residue exiting the reactor tube such that when pyrolysis of feedstock containing a contaminant occurs in the reactor tube, filtering of the gases of pyrolysis leads to lower containment of the contaminant in the gaseous output and higher capture and concentration of the contaminant in the feedstock residue.

49. The process according to claim 46, wherein said means for heating the feedstock within said reactor tube comprises a combustion chamber positioned such that the combustion chamber is in direct thermal contact with the reactor tube such that heat generated within the combustion chamber is transferred to the feedstock in the reactor tube to provide heat of pyrolysis.

50. The device according to claim 49, wherein said inner hopper is positioned such that heat generated in the combustion chamber is transferred to the feedstock in the inner hopper.

* * * * *

UNITED STATES PATENT AND TRADEMARK OFFICE
CERTIFICATE OF CORRECTION

PATENT NO. : 6,048,374
DATED : April 11, 2000
INVENTOR(S) : Alex E. S. Green

It is certified that error appears in the above-identified patent and that said Letters Patent is hereby corrected as shown below:

Column 8, line 21: "KW" should read --kW--.

Column 8, line 23: "KWe." should read --kWe.--.

Column 8, line 24: "1 KWe," should read --1 kWe,--.

Column 8, line 25: "BTU/KW" should read --BTU/kW--.

Column 8, line 31: "KJ = 19 KJ" should read --kJ = 19 kJ--.

Column 8, line 32: "15 KJ, about 4 KJ" should read --15 kJ, about 14 kJ--.

Column 8, line 34: "30 KJ/g" should read --30 kJ/g--.

Column 8, line 34: "6 KJ" should read --6 kJ--.

Column 9, line 30: "burner-spider 14" should read --burner-spider 19--.

Column 10, line 5: "purpose" should read --purposes--.

UNITED STATES PATENT AND TRADEMARK OFFICE
CERTIFICATE OF CORRECTION

PATENT NO. : 6,048,374
DATED : April 11, 2000
INVENTOR(S) : Alex E. S. Green

It is certified that error appears in the above-identified patent and that said Letters Patent is hereby corrected as shown below:

*In the Claims*

Column 10, line 24: "though the feedstock" should read --through the feedstock--.

Column 12, line 2: "though the feedstock" should read --through the feedstock--.

Column 12, line 44: "inner," should read --inner hopper--.

Column 12, line 46: "in hopper" should read --in the inner hopper--.

Column 13, line 13: "48" should read --44--.

Signed and Sealed this

Twenty-fourth Day of April, 2001

Attest:

NICHOLAS P. GODICI

*Attesting Officer*      Acting Director of the United States Patent and Trademark Office